United States Patent [19]

Segal

[11] 4,291,084
[45] Sep. 22, 1981

[54] WARP-FREE MULTI-LAYER STAMPABLE THERMOPLASTIC SHEETS

[75] Inventor: Leon Segal, Randolph, N.J.

[73] Assignee: Allied Chemical Corporation, Morris Township, Morris County, N.J.

[21] Appl. No.: 67,483

[22] Filed: Aug. 16, 1979

Related U.S. Application Data

[63] Continuation-in-part of Ser. No. 889,573, Mar. 23, 1978, abandoned.

[51] Int. Cl.$^3$ .................... B32B 5/16; B32B 27/04
[52] U.S. Cl. .................... 428/212; 428/287; 428/297; 428/303; 428/324; 428/363; 428/474.9
[58] Field of Search ............ 428/74, 251, 268, 273, 428/285–289, 324, 363, 407, 515, 474, 283, 212, 297, 303; 260/37 R, 37 N, 42.43; 264/110; 106/193 M

[56] References Cited

U.S. PATENT DOCUMENTS

| | | | |
|---|---|---|---|
| 3,158,528 | 11/1964 | Brown | 428/324 |
| 3,539,437 | 11/1970 | Kirk et al. | 428/328 |
| 3,684,645 | 8/1972 | Temple et al. | 428/220 |
| 3,764,456 | 10/1973 | Woodhams et al. | 260/38 |
| 3,799,799 | 3/1974 | Woodhams | 260/42.43 |
| 3,931,094 | 1/1976 | Segal et al. | 260/42.18 |
| 4,044,188 | 8/1977 | Segal | 428/283 |
| 4,098,943 | 7/1978 | Degginger et al. | 428/283 |

Primary Examiner—Paul J. Thibodeau
Attorney, Agent, or Firm—Richard A. Negin; Patrick L. Henry

[57] ABSTRACT

Disclosed are laminated thermoplastic sheets containing one or more pairs of thermoplastic layers wherein the total number of layers are even. Each pair is comprised of a surface layer containing a thermoplastic polymer and high aspect ratio mica flakes and a strength layer containing a thermoplastic polymer and long glass fiber. The laminated sheet is essentially warp-free with exceptionally good surface appearance, and can be stamped into a shaped article retaining these characteristics.

16 Claims, 2 Drawing Figures

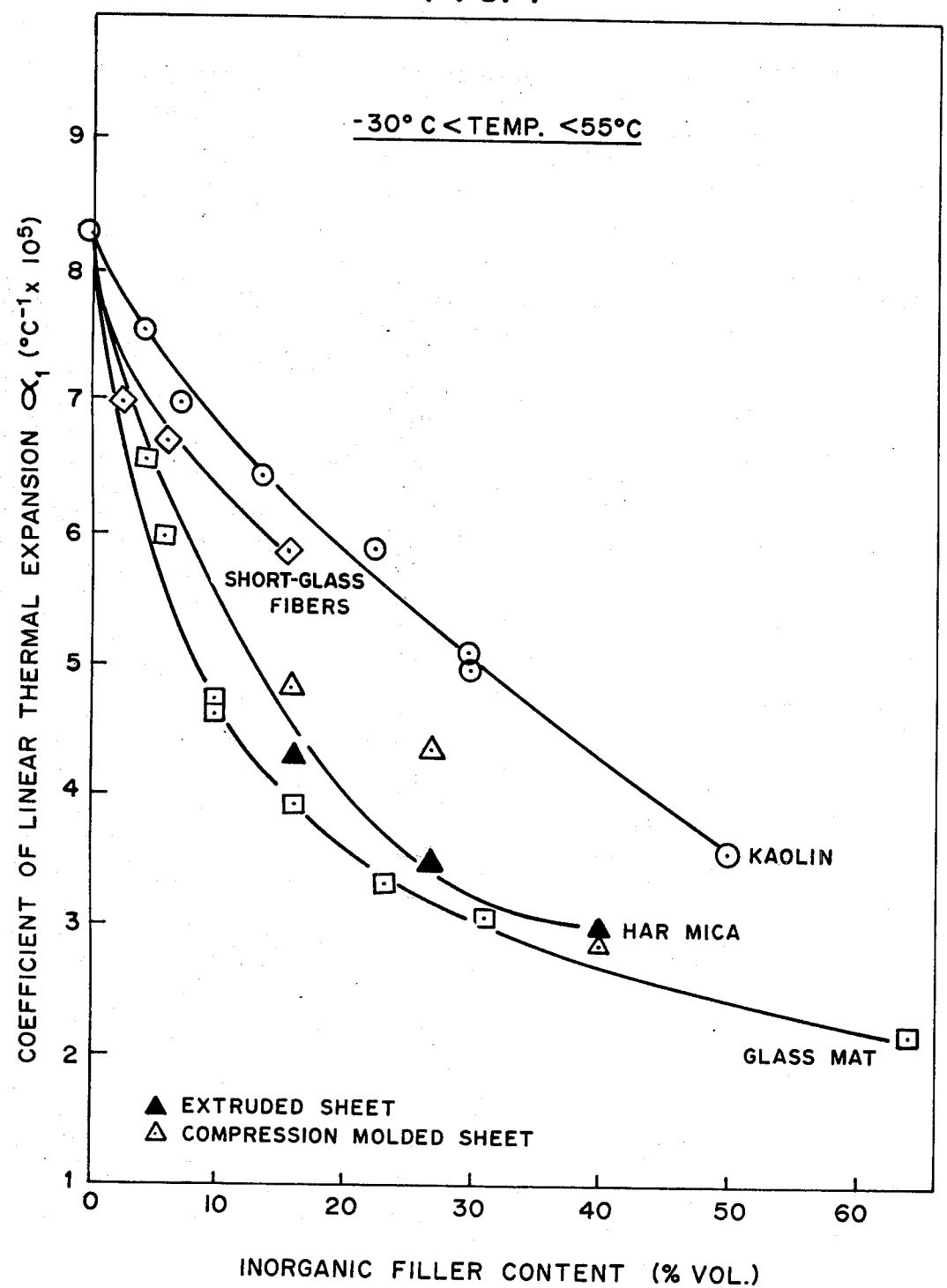

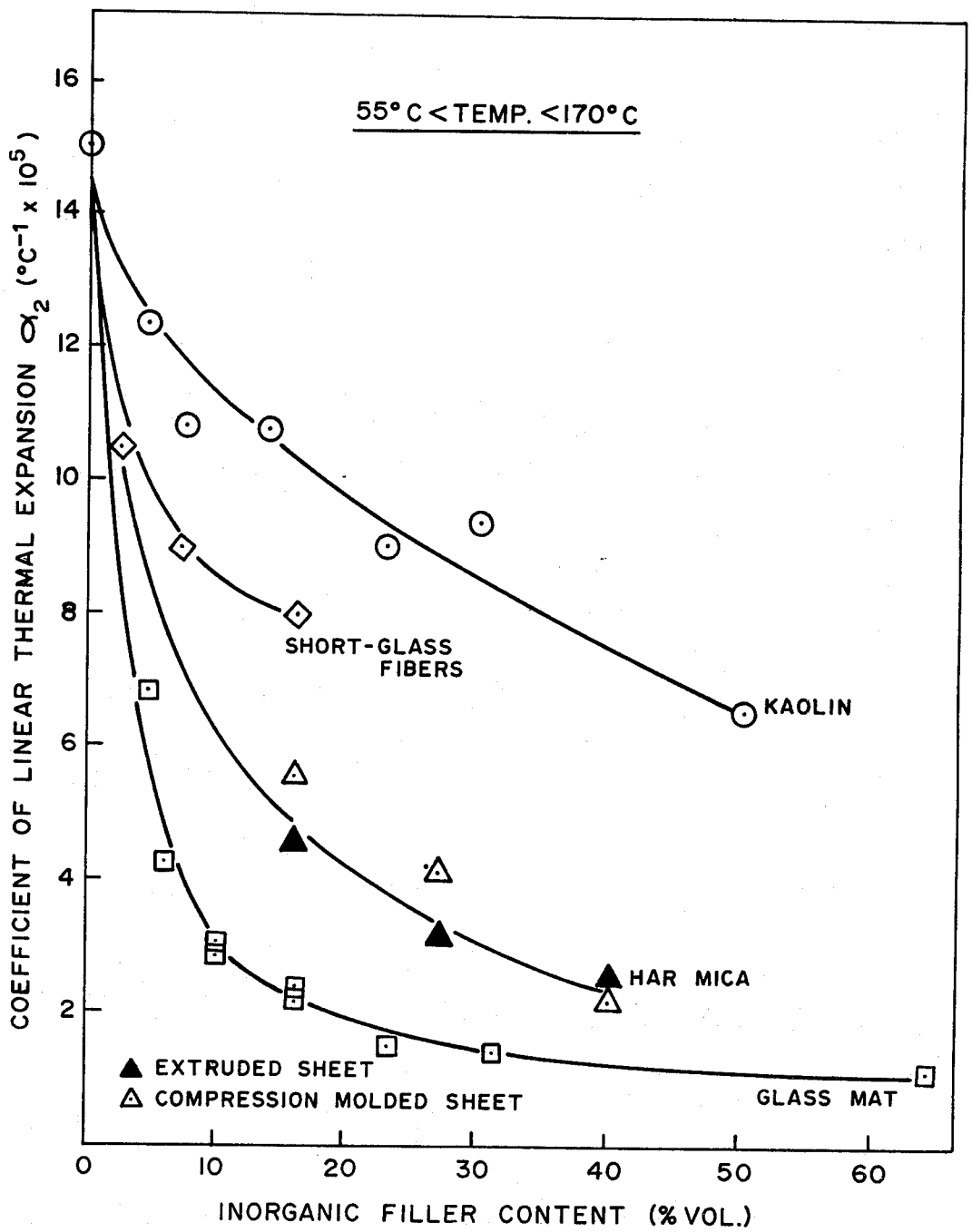

WARP-FREE MULTI-LAYER STAMPABLE THERMOPLASTIC SHEETS

CROSS-REFERENCE TO RELATED APPLICATION

This invention is a continuation-in-part of co-pending application Ser. No. 889,573, filed Mar. 23, 1978 now abandoned.

DESCRIPTION

BACKGROUND OF THE INVENTION

1. Field of the Invention

This invention relates to reinforced thermoplastic sheets and more specifically to warp-free multi-layer thermoplastic laminate sheets having both good surface and high strength qualities.

2. Discussion of the Prior Art

Various thermoplastic composite sheet materials are known in the art. For example, such thermoplastic polymers as polyolefins, polyamides, polyesters and the like can be reinforced with a myriad of reinforcing materials, examples of which include particulate fillers such as alumina, talc, clay, etc; flake-like fillers such as mica; and reinforcing fibrous material such as glass fibers, metal fibers, carbon fibers, etc. For example, U.S. Pat. No. 3,158,528 teaches thermoset and thermoplastic polymers reinforced with a combination of glass flakes, mica, and fibrous glass. Laminates prepared from such compositions are taught as being characterized by unusually low coefficients of linear thermal expansion. Also U.S. Pat. No. 3,684,645 teaches the reinforcement of a thermoplastic resinous sheet with relatively long glass fiber strands and relatively short glass fibers.

The presence of long glass fibers is particularly desirable to increase the toughness and impact resistance of the sheet. However, such long glass fibers lead to poor surface finish on the final product. For applications such as automotive exterior parts, appliance housings, furniture components, etc., a perfectly smooth, imperfection-free surface is mandatory. The measured depth of surface imperfections should be no more than 50–500 microinches ($10^{-6}$ inch) when measured using a standard Bendix Corp. Micro-corder, profilometer or similar stylus-type profile indicator. A high concentration of long glass fibers near the surface of the finished product ordinarily leads to imperfections larger than this limiting value. Attempts have been made to solve this problem by locating the glass fibers adjacent to the non-decorative (unseen) surface of the sheet. However, this results in an uneven coefficient of thermal expansion of the sheet which is evidenced by warping of the sheet or products formed therefrom.

Other attempts have also been made to solve this surface finish problem. For example, U.S. Pat. No. 3,684,645 discloses a sheet comprised of a glass fiber strand mat confined with a thermoplastic polymer containing short glass fibers wherein the short glass fibers in the resin provide improved surface properties. Also, U.S. Pat. No. 4,044,188 discloses a smooth surfaced thermoplastic composite sheet containing at least one surface layer of thermoplastic polymer, particulate filler, and short glass reinforcing fibers and another layer containing thermoplastic polymer and relatively long or continuous glass fibers.

Although sheets and finished laminated products prepared according to these patents, as well as other prior art teachings are apparently smooth, they fail to pass the visual inspection test to which finished painted parts are normally subjected to in the automotive industry. One such test is to view the reflection of a fluorescent light on the painted part to determine if the surface has imperfections such as "orange peel" effects, roughness, waviness, ripples, etc. If the surface contains these imperfections, the part is rejected. Also, a problem has been found with "show-through" of the long glass fibers or mat which is again a visual test applied to the painted part.

Another problem associated with these prior art materials is warpage which is generally caused by grossly different average coefficients of linear thermal expansion (hereinafter referred to as CTE) for each layer over the operating temperature range of use. In order to overcome this warpage problem it has generally been the practice to prepare laminate sheets having an odd number of (at least three) layers so that the outer two layers could be used to balance the CTE on either side of a central core.

What is desired in the art however, is a two-layer laminated thermoplastic sheet rather than a three-layered sheet. Such a sheet would be more convenient, efficient and economical to manufacture. But warpage of such a sheet is an ever-present problem. This is due to the fact that a thermoplastic layer, such as nylon-6, containing various reinforcing aids, such as long fiberglass or mica exhibits one CTE below the glass transition temperature ($T_g$) of the thermoplastic material, and another CTE above the glass transition temperature. Thus, the problem of matching the CTE's of two thermoplastic layers to form a warp-free laminated sheet is a more complex one than merely trying to match the CTE's of two different filled thermoplastic layers at a particular temperature.

A further complication was discovered by Leon Segal, published in *Polymer Engineering and Science*, April, 1979 Vo. 19, No. 5. Particulate filled nylon-6 compositions usually exhibit an $\alpha_1$, the CTE below the $T_g$, which is smaller in value than $\alpha_2$, the CTE above the $T_g$. For example, nylon-6, containing 20 percent by weight fine particle size kaolin, exhibits an $\alpha_1$, of $5.93 \times 10^{-5}$ C.$^{-1}$, from $-30°$ C. to $T_g$ ($50-55°$ C.), and an $\alpha_2$ of $12.10 \times 10^{-5}$ C.$^{-1}$, from $T_g$ to $+170°$ C. However, Segal discovered that weight loadings of long glass fiber above 10 weight percent in nylon-6, produced a lower $\alpha_2$ than $\alpha_2$, and further, the value of $\alpha_2$ was very low. Since most materials exhibit a larger $\alpha_2$ than $\alpha_1$, matching a 10 percent by weight loading of long fiberglass in nylon-6, for example, with another layer of nylon-6, in which the CTE's were similar would be a difficult task.

SUMMARY OF THE INVENTION

We have unexpectedly found that an even layered warp-free laminate can be prepared from a strength layer containing 10 weight percent, or greater, of long fiberglass. The strength layer is used as part of a pair in combination with a surface layer containing high aspect ratio mica in about 10 to 75 weight percent of the layer, and the problem associated with matching of CTE's of the respective layers has unexpectedly been solved by employing a ratio of the volume percent mica in the surface layer to the volume of long glass fiber mat in the strength layer of about 1.75 to 2.5.

Thus, a laminated thermoplastic sheet can be constructed containing one or more pairs of layers, the total number of said layers being even, and each layer comprised of a strength layer and a surface layer. The strength layer should preferably contain 20 to 40 wt. % long-glass fibers having a length of at least about one inch resulting in high impact resistance, heat resistance and strength. Thus the aforementioned problems associated with thermoplastic sheets reinforced with long glass-fiber, are overcome since the surface layer is able to (a) suppress the glass-fiber show-through (b) balance the extremely low CTE of the fiber reinforced layer, (c) contribute to stiffness and low material cost to the composite, and (d) minimize "sink" marks behind ribs and bosses.

The subject laminate sheet is also advantageous from an economical and processing standpoint. For example, by use of the presently claimed invention a two layer warp-free laminate can be prepared, thereby eliminating the need for an additional hidden surface layer whose only function is to balance the CTE of the other surface layer. Also a thinner bi-layered laminate sheet can be processed more efficiently with shorter cycle times than can tri-layered laminate sheets.

In accordance with the present invention, a composite thermoplastic sheet having superior surface appearance is provided which comprises one or more pairs of thermoplastic layers, the total of said layers being even, wherein each pair of layers is comprised of: (a) a surface layer consisting essentially of a thermoplastic polymer and about 10 to 75 weight percent, based on the total weight of the surface layer, of mica, having an aspect ratio of at least 20 to 1; and (b) a strength layer adjacent to said surface layer comprised of a thermoplastic polymer and about 10 to 60 weight percent, based on the total weight of the strength layer, of glass fiber having a length of at least about one inch, said mat being enclosed in a matrix of said thermoplastic, wherein the ratio of the volume percent of said mica in the surface layer to the volume percent of said fiberglass mat in the strength layer is about 1.75 to 2.5.

Preferred embodiments are where the thermoplastic layers are comprised of the same material, being nylon-6, where the surface layer contains about 40 to 65 wt. percent mica, the strength layer contains about 20 to 40 wt. percent long glass fiber and wherein the ratio of the volume percent of mica in the surface layer to the volume percent of fiberglass mat in the strength layer is about 1.75 to 2.2. Hence, by an averaging effect, the composite sheet resists warping, distortion, and interlaminar separation as well as having excellent surface appearance.

Also within the scope of the present invention are warp-free composite sheets with an overall average CTE in the range of about 2 to $3 \times 10^{-5}$ °C.$^{-1}$, over a temperature range of about 23° C. to 170° C., laminated to a metal sheet, such as steel or aluminum. Since metals have a CTE of about 2 to $3 \times 10^{-5}$ °C. over the temperature range of 23° to 170° C., the average expansion, as a function of the deviation in the respective expansion coefficients over the temperature range, of both polymer and metal layers should be about equal. The composite and metal sheets can be laminated together by means of fasteners, glue, etc. to provide a combined structure which expands and contracts equally regardless of thickness, number of layers, etc. Without distortion or layer separation. However, glues, paints, surface or decorative layers are not considered as separate layers for purposes of this invention.

BRIEF DESCRIPTION OF THE DRAWINGS

The present invention will be further illustrated by reference to the drawings in which:

FIG. 1 represents the coefficient of linear thermal expansion of poly (epsilon-caprolactam) composites containing various fillers below the glass transition temperature (Tg) of poly (epsilon-caprolactam).

FIG. 2 represents the coefficient of linear thermal expansion of poly-(epsilon-caprolactam) composites containing various fillers above the Tg of poly-(epsilon-caprolactam).

DETAILED DESCRIPTION OF THE INVENTION

In accordance with a preferred embodiment of this invention, the top or surface layer comprises a thermoplastic polymer and about 10 to 75, preferably about 40 to 65 weight percent mica based on the total weight of the surface layer. The mica is preferably of the muscovite type and has an aspect ratio (i.e., average diameter divided by thickness) of at least about 20:1, preferably of about 40:1, and more preferably of about 50:1 to 200:1 and is generally known as high aspect ratio (HAR) mica. Such plate-like filler is known and is described, for example, in U.S. Pat. Nos. 3,764,456 and 3,799,799 hereby incorporated by reference.

The thermoplastic polymer may be the same or different in each layer but preferably is the same in order to maximize the total adhesion between the layers. Suitable thermoplastic materials which may be employed comprise a wide range of polymeric composition. Representative examples include olefinic polymers such as polyethylene, polypropylene and copolymers and terpolymers thereof, e.g. copolymers of ethylene and ethyl acrylate; vinyl polymers comprising one or more of the following monomers: vinyl aryls such as styrene, o-phenylstyrene, m-phenylstyrene, p-phenylstyrene, o-methylstyrene, m-methylstyrene, p-phenylstyrene, o-methoxystyrene, m-methoxystyrene, p-methoxystyrene, o-nitrostyrene, m-nitrostyrene, p-nitrostyrene, and the like; vinyl and vinylidene halides, such as vinyl chloride, vinylidene chloride, vinylidene bromide, and the like; vinyl esters such as vinyl acetate, vinyl propionate, vinyl butyrate, vinyl chloroacetate, vinyl benzoate, and the like; polycarbonates, that is, thermoplastics containing the following repeating units:

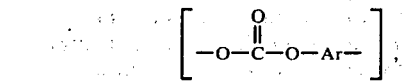

wherein Ar is the residue of an aromatic dihydric phenol; cellulosics, such as cellulose acetate, cellulose triacetate, cellulose acetate butyrate, cellulose propionate, ethyl cellulose, and the like; polyamides; polyesters, such as polyethylene terephthalate, polyethylene isophthalate, poly(ethylene-2,7-naphthamate), polybutylene terephthalate, polypropylene terephthalate, copolymers thereof and the like; chlorinated polyethylene, chlorinated polyvinyl chloride, polyfluoroethylene, polytrifluorochloroethylene, polyhexafluoropropylene, copolymers thereof, such as copolymers of vinylidene fluoride and trifluorochloroethylene, and the like, as well as mixtures of any of the above.

Also suitable for use herein are polyurethane polymers, polysulfone polymers, polyacetal polymers, halogenated olefins, and phenoxy polymers. Included in the term "polymer" are blends of two or more polymeric materials. Also contemplated within the term "polymer" are the metallic salts of those polymers or blends thereof which contain free carboxylic acid groups. Representative examples of such polymers include ethylene-acrylic acid copolymers and ethylene-methacrylic acid copolymers. Illustrative of the metals which may be used to provide the salts of such carboxylic acid polymers are the mono-, di-, and tri- valent metals such as sodium, calcium and aluminum.

Preferred thermoplastic polymers are polyamides, polyolefins, and polyesters, such as polypropylene, polyethylene, polybutylene terephthalate, and polyethylene terephthalate; and particularly preferred are the polyamides. Representative examples of such polyamides are: (a) those prepared by the polymerization of lactams, preferably epsilon-caprolactam; (b) those prepared by the condensation of a diamine with a dibasic acid, preferably the condensation of hexamethylene diamine with sebacic acid; (c) those prepared by self-condensation of amino acids, preferably self-condensation of 11-aminoundecanoic acid; and (d) those based on polymerized vegetable oil acids, or random, block, or graft interpolymers consisting of two or more of these polyamides. Preferred is that obtained by the polymerization of epsilon-caprolactam. This includes polycarprolactams containing (a) carboxyl groups attached to both ends of the polymer chain; (b) a carboxyl group attached to one end and an acetamide group attached to the other end of the chain; (c) amino groups attached to both ends of the polymer chain; and (d) a carboxyl group attached to one end and an amino group attached to the other end of the polymer chain.

The term "long glass fibers" as used herein is intended to be employed in a broad sense to include glass mat, as well as individual continuous fibers, more particularly known as filaments, which have a length at least about 1 inch, and preferably 2 inches. Groups of twisted strands, more particularly known as yarn or thread; untwisted or slightly twisted groups of strands generally looped back on one another, more particularly known as roving; discontinuous lengths of fibers, more particularly known as staple fibers, which can be spun into threads, twisted strands, slivers, roving or yarn. Preferred is glass fiber strand mat in the form of strands or bundles which are at least about 1 inch to continuous in length. This mat can be woven or nonwoven and if nonwoven, the strands or fibers are held together by resinous adhesive binders or by "needling." If woven, the strands or fibers are held together by mechanical interaction of the randomly patterned web-like structure. In one commercially available form of strand mat, the long strands are chopped strands which are 2 to 20 inches in length, preferably 3 to 10 inches.

The strands are composed of a plurality of fibers usually numbering 2 to 400, preferably 5 to 120. The individual fiber diameter ranges from about 0.0002 to 0.001 inch, preferably 0.0003 to 0.0008 inch and the strand diameter measures at least 0.001 inch and preferably 0.0015 to 0.004 inch in diameter.

It is also within the scope of the present invention that other reinforcing fillers can be used in combination with the mica and glass fibers preferred herein. For example the mica or glass reinforced thermoplastic choice may also contain particulate fillers. Such fillers may be selected from a wide variety of minerals, metals, metal oxides, siliceous materials, metal salts, and mixtures thereof. These fillers may optionally be treated with various coupling agents or adhesion promoters, as is known to those skilled in the art. Advantageous physical properties are achieved if the filler material has a Young's modulus of $10^7$ psi or greater and at least a Young's modulus twice as great as that of the polymer. Examples of fillers included in these categories are alumina, aluminum hydrates, feldspar, asbestos, talc, calcium carbonates, clay, carbon black, quartz, novaculite, and other forms of silica, kaolinite, bentonite, garnet, saponite, beidellite, calcium oxide, wollastonite, calcium hydroxide, etc., as well as short reinforcing fibers (less than 2 inches in length) such as glass, metal, carbon, jute, hemp or sisal fibers. The fillers listed above are given as examples only and are not intended as a limitation on fillers that can be utilized in the invention. The fillers may be coated with sizing agents, coupling agents, adhesion promoters, wetting agents and the like, as are known to those skilled in the art. The precise amount of other reinforcing filler, if incorporated into the instant sheets will vary depending on such things as the amount of mica and long glass fibers used as well as the desired CTE and physical properties of the composite sheet. The precise amount, stated on the instant specification can be determined by routine experimentation by one skilled in the art.

Other conventionally known additives of value in thermoplastic sheet formulations are also suitable for use herein. Nonlimiting examples of such additives include antistatic agents, plasticizers, lubricants, nucleating agents, impact modifiers, colorants, heat and light stabilizers, and other similar processing aids and adjuvants.

The long glass fiber strand, mica and other fillers described herein can be treated with a coupling agent which has the ability to enchance the bonding of the thermoplastic polymer with the chopped strand mat. The coupling agent can be applied to the individual fibers or other fillers during forming and/or to the strands in the mat. Non-limiting examples of such coupling agents suitable for use herein include chromic chloride complexes as well as various silane and siloxane materials such as hydrolyzable vinyl, alkyl, amino, methacryloxy, epoxy, and glycidoxy silanes as well as their hydrolysis products and polymers of the hydrolysis products and mixtures thereof. Preferred are the silanes and siloxanes; more preferred are the silanes.

The surface layer of the present sheets may be formed by extruding, calendering or casting a mass comprising the polymer and mica, together with optional additives, into a sheet. Such mass may be formed by blending the mica with a liquid resin (melted polymer or solution or dispersion of the polymer) or dry blending with polymer pellets or the like. Preferably, the mass is dry blended and fed to an extruder wherein it is extruded into a sheet having a thickness of, for example, about 5 to 250 mils, preferably 10 to 125 mils. Most preferably, the surface sheet (layer) has a thickness of at least about 40 mils to provide adequate masking of the glass fibers.

The strength layer is preferably formed by combining a mat of long glass fibers (2 inches to continuous in length) with the thermoplastic polymer. This may be achieved using conventional laminating or impregnating techniques employed in the art, such as compression molding, extrusion calendaring, extrusion laminating, extrusion coating, dip coating, powder impregnation, knife coating and the like. The mat of long glass fibers may be a woven or non-woven assembly of glass fibers or strands having a length of at least about 2 inches. The glass may be used in the form of filament, strand, thread, yarn, roving, nonwoven scrim, and the like.

The glass fibers may be treated or coated with one or more of the various types of sizing agents or coatings which are employed by those in the art. These sizing agents are usually multicomponent compositions which will comprise one or more lubricants, emulsifying agents, coupling agents, pH adjusters, film forming synthetic binders, antistatic agents and/or wetting agents and the like. Preferred are coupling agents comprised of organosilicon compounds such as silyl peroxide compounds, alkoxysilanes, aminoalkoxysilanes, vinylalkoxysilanes and aminoalkylalkoxysilanes.

Preferably, the strength layer is formed by extruding a mass of the thermosplastic polymer and laminating a fiber glass mat thereto while the extrudate is still at an elevated temperature. Preferably, the lamination procedure employs sufficient pressure to force the mat into the extrudate sheet, more preferably to approximately the center of the sheet thereby encasing said mat with the sheet. Preferably, the strength layer has a thickness of about 2 to 200 mils, more preferably about 4 to 100 mils. The glass fiber content of the second sheet is in the range of about 10 to 50%, preferably 20 to 40%, by weight based on the total weight of the second sheet.

The composite sheet may be formed by laminating the two layers together, preferably continuously, subsequent to extrusion of each layer so that advantage can be taken of the thickness of the layers. The total thickness of the composite sheet is preferably in the range of 7 to 350 mils, more preferably 75 to 250 mils.

Additionally, the sheets can be laminated together by means of fasteners, glue, epoxy, and the like to provide a combined structure which expands and contracts equally regardless of the thickness, without warping or distortion of the layers.

In a preferred embodiment of the present invention, the overall bi-layered composite sheet possesses a good surface after painting; adequate mechanical strength with a unidirectional flexural strength of about 8,000 to 25,000 psi preferably 9,000 to 20,000 psi; heat resistance as measured by HDT of about 160° to 220° C., preferably 180° to 210° C. with essentially no warpage upon heating; high stiffness with a unidirectional flexural modulus of approximately $1 \times 10^6$ to $5 \times 10^6$ psi (dry), preferably $1 \times 10^6$ to $3 \times 10^6$ psi (dry); and an Izod impact strength of about 2 to 20 ft-lb/in, preferably about 2 to 15 ft-lb/in. All of the above properties are measured according to ASTM requirements.

Warpage is effectively eliminated by choosing the surface and strength layers, and definite weight or volume percentages of HAR mica and long glass fiber therein, such that the ratio of the volume percent of mica in the surface layer to the ratio of the glass fiber mat in the strength layer is about 1.75 to 2.5, and preferably 1.75 to 2.2. The reason why this mathematical relationship between the volume percentages of mica and fiberglass of the surface and strength layers, respectively, results in even-layered warp-free laminates is not clearly understood. A theory that we do not wish to be bound by is that this ratio of volume percentages results in an overall averaging or compensatory effect between the respective volume and linear expansions that occur during variations in temperature.

Warpage can be measured by taking the laminated bi-layered sheets, or stamped, shaped parts, and heating or cooling them to use temperature. Deviation from original flatness or configuration, or in the case of some shaped parts, the deviation of radius of curvature, is the amount of warpage. By essentially warp-free we means less than about 5% warpage for flat sheets and less than about 3% warpage for shaped, formed parts. Although attempts have previously been made at elminating warpage of laminated multi-ply thermoplastic sheets, these attempts have generally been directed to the preparation of a laminate sheet containing an odd number of layers. For example, essentially warp-free tri-layer laminate thermoplastic sheets have been produced wherein the two outer layers are of equal thickness and composition. In this manner, the linear expansion of these two layers would cancel each other out and suppress warpage even though the CTE of these two layers does not equal that of the center layer, i.e., the "neutral axis" layer.

Such tri-layered laminates are commercially unattractive when compared with the bi-layered sheets as presently claimed because: (1) lamination of a tri-layered laminate on a continuous basis is substantially more expensive in time, man hours, machinery, etc.; (2) since only one appearance-grade surface is ordinarily needed, the bottom layer is actually wasted and used only to off-set the CTE effect of the top layer; and (3) the center (strength) layer, which is preferably a glass-fiber reinforced thermoplastic structure, is least effective and often negligibly effective, in increasing the stiffness of the sheet when placed at or near the center of a laminate.

The CTE of the compositions of the present invention was measured at various temperatures by a modified ASTM D-696 procedure. The modification involved continually measuring the linear expansion over a temperature range of $-30°$ C. to $170°$ C. as opposed to only at the extremes. The CTE values were plotted and it was found that the expansion curves were linear between $-30°$ C. and $55°$ C., and changed slope but remained linear again between $55°$ C. and $170°$ C. The change in slope at approximately $55°$ C. is well known and corresponds to the glass transition (Tg) temperature of the dry nylon.

Also a subject of this invention is a laminate comprising the subject laminated sheet, described herein, having an average overall CTE of about 2 to $3 \times 10^{-5°}$ C.$^{-1}$, over the temperature range of about $23°$ to $170°$ C., laminated to a metal sheet having substantially the same CTE.

It has been found that to produce a warp-free laminate composite with a metal sheet and the subject laminate, the CTE's of both sheets should be substantially the same. The CTE of most metals is about 2 to $3 \times 10^{-5°}$ C.$^{-1}$, including steel, aluminum, copper, brass, tin and the like and thus the thermoplastic laminate should possess substantially the same CTE.

Methods for measuring the CTE's of the different layers is the same as described above, as well as methods for laminating thermoplastic materials. These methods can also be suitably used for laminating the abovedescribed thermoplastic composite/metal sheet structure.

The following examples are illustrative of the present invention and of the best mode contemplated for practicing the invention. The present invention is not to be interpreted as limited to all details of the examples.

EXAMPLES

Polyamide sheet compositions were prepared comprised of poly (epsilon-caprolactam) having a number average molecular weight of 20,000 as measured by membrane osmometry and various filler and fiber materials in a variety of concentrations as illustrated in Tables I and II below. The sheets containing filler weere prepared by dry blending pelletized poly (epsilon-caprolactam)and the filler in a drum until a homogeneous mixture was obtained.

The dry blend was then melt blended in an extruder at about 250° C. and the extrudate compression molded at about 490° F. into sheets having the dimensions 10"×10", and thickness of ⅛".

When glass mat was used, a weighed portion of said mat was placed in a compression mold whereupon a particular amount of pelletized polyepsiloncaprolactam was placed on top of the mat. The pellets and mat were then compression molded at about 450° F.

Coefficient of linear thermal expansion measurements were made on each sheet by use of a quartz tube dilatometer according to the procedure set forth in ASTM D-696 modified in such a way that the length change was measured at several random points between $-30°$ C. and $+30°$ C. as opposed to measurements only at each extreme as called for in ASTM D-696.

C. Temp. 55° C.) of dry polyepsiloncaprolactam. FIG. 2 represents the coefficient of linear thermal expansion of polyepsiloncaprolactam composites above the Tg (55° C. Temp. 170° C.) of dry polyepsiloncaprolactam.

By use of the aforementioned CTE curves, constructed by the invention, it is possible to match the $\alpha_1$, and $\alpha_2$ values of a reinforced polyepsiloncaprolactam surface sheet with those of a glass mat reinforced polyepsiloncaprolactam strength layer, given the particular volume percent of glass mat in the strength layer and the volume percent of HAR mica in the surface layer. It is evident in both the Tables and the Figures that only HAR mica is capable of satisfying the requirement of $\alpha_1$, and $\alpha_2$ in a surface layer sufficiently to allow warp-free lamination with a long fiber glass reinforced strength layer over a relatively extended range of glass mat loading. Composite laminates wherein the ratio of the volume percent of mica in the surface layer to the volume percent of fiberglass mat in the strength layer is about 1.75 to 2.5, are characterized as being essentially warp-free.

It will be noted that in addition to satisfying the physical relationships between the individual layers of the laminate, a small amount of routine experimentation may be required with respect to determining the appropriate thickness, environment after lamination, temperature, etc. of the layers, in order to achieve a warp-free laminate structure or finished part. However, such routine experimentation will be within the skill of the art in light of this disclosure.

TABLE I

| Ex | Filler | Wt. % poly-epsilon-caprolactam | Vol % poly-epsilon-caprolactam | $(°C._1^{-1} \times 10^5)$ $-30°$ C. T 55° C. | $(°C._2^{-1} \times 10^5)$ 55° C. T 170° C. |
|---|---|---|---|---|---|
| 1 | HAR mica[1] | 70 | 83.9 | 3.28 | 4.56 |
| 2 | HAR mica | 55 | 73.0 | 2.49 | 3.12 |
| 3 | HAR mica | 40 | 60.0 | 2.00 | 2.52 |
| 4 | glass mat | 90 | 95.3 | 5.57 | 6.66 |
| 5 | glass mat | 88 | 94.0 | 4.96 | 4.19 |
| 6 | glass mat | 80 | 89.9 | 3.73 | 2.78 |
| 7 | glass mat | 70 | 83.9 | 3.29 | 2.32 |
| 8 | glass mat | 60 | 77.0 | 2.31 | 1.46 |
| 9 | glass mat | 50 | 69.0 | 2.08 | 1.44 |
| 10 | glass mat | 20 | 35.8 | 1.14 | 1.14 |

[1]high aspect ratio mica having an average aspect ratio of about 90.

The following are comparison examples of reinforced polyepsiloncaprolactam sheets prepared with various fillers other than those constituting the presently claimed invention.

TABLE II

| Ex | Filler | Wt. % poly-epsilon-caprolactam | Vol % poly-epsilon-caprolactam | $\alpha_1 (°C.^{-1} \times 10^5)$ $-30°$ C. T 55° C. | $\alpha_2 (°C.^{-1} \times 10^5)$ 55° C. T 170° C. |
|---|---|---|---|---|---|
| Control | — | 100 | 100 | 8.30 | 14.9 |
| C1 | kaolin | 90 | 95.3 | 6.55 | 12.14 |
| C2 | kaolin | 85 | 92.5 | 5.97 | 10.71 |
| C3 | kaolin | 73 | 86.0 | 5.44 | 10.93 |
| C4 | kaolin | 60 | 77.6 | 4.86 | 8.97 |
| C5 | kaolin | 51 | 70.0 | 4.08 | 9.24 |
| C6 | kaolin | 50 | 70.0 | 3.97 | 7.64 |
| C7 | kaolin | 30 | 50.0 | 2.52 | 6.46 |
| C8 | SGF[1] | 94 | 97.2 | 6.00 | 10.43 |
| C9 | SGF | 86 | 92.7 | 5.70 | 8.97 |
| C10 | SGF | 70 | 84.0 | 4.86 | 7.94 |
| C11 | mica | 70 | 83.9 | 10.9 | 33.9 |
| C12 | mica | 55 | 73 | 8.9 | 24.1 |
| C13 | mica | 40 | 60 | 2.3 | 4.1 |

[1]SGF = short glass fiber (less than 0.030 inches means length after injection molding)

The volume percent and CTE data appearing in Tables I and II above for kaolin, short glass fibers, HAR mica, and glass mat was plotted and are represented by curves shown in FIGS. 1 and 2 herein. FIG. 1 represents the coefficient of linear thermal expansion of polyepsiloncaprolactam composites below the Tg ($-30°$

EXAMPLES 11-15

With the aid of FIGS. 1 and 2 of the present application, several warp-free bi-layered composite sheets were prepared by laminating together a strength layer of polyepiloncaprolactam and glass fiber mat and a surface layer of polyepsiloncaprolactam and HAR mica. The individual sheets were prepared according to the procedure set forth in Examples 1-10 above and then were compression-molded together at a temperature of about 490° F. The sheets had a thickness of about 0.060" each. Tables III and IV below illustrate specific compositions resulting in warp-free laminates.

TABLE III

| Ex. | Surface Layer Vol. % Mica[1] | Surface Layer Wt. % Mica[1] | Strength Layer Vol. % Mat[2] | Strength Layer Wt. % Mat[2] |
|---|---|---|---|---|
| 11 | 12.0 | 24.6 | 5.0 | 10.0 |
| 12 | 22.0 | 37.5 | 10.0 | 19.5 |
| 13 | 29.5 | 49.0 | 15.0 | 28.0 |
| 14 | 35.5 | 55.6 | 20.0 | 36.0 |
| 15 | 60.0 | 77.4 | 30.0 | 48.5 |

[1] = volume or weight percent based on the total volume or weight of the surface layer and a mica having an average aspect ratio of about 90.
[2] = volume or weight percent based on the total volume or weight of the strength layer.

TABLE IV

| Example | Ratio of Volume Percentages of Mica/Fiber Glass Mat in Surface And Strength Layers Respectively |
|---|---|
| 11 | 2.4 |
| 12 | 2.2 |
| 13 | 1.96 |
| 14 | 1.77 |
| 15 | 2.0 |

EXAMPLE 16

A sheet of 35 vol. % HAR mica and 65 vol. % polyepsiloncaprolactam having a thickness of 0.100" is prepared according to the procedure of Examples 1-10. A metal laminate of this mica-filled sheet is prepared by placing said sheet onto a rolled steel substrate having a thickness of 0.020". Adhesion between the polyepsiloncaprolactam sheet and steel substrate is accomplished by the use of a thin layer of epoxy adhesive. The composite sheet is cycled between high and low temperatures (−20° C. to +150° C.) and no delamination or warpage of the composite sheet is observed.

EXAMPLE 17

The procedure of Example 16 is repeated but instead of a rolled steel substrate, an aluminum substrate of the same thickness is used. The mica-containing sheet contains 8.7 vol. % or 17 wt. % HAR mica (aspect ratio of about 90) and is 0.100" thick. Delamination or warpage is not observed after cycling the composite structure between high and low temperatures.

What is claimed is:

1. A warp-free laminated sheet comprised of at least one pair of thermoplastic layers, the total number of said layers being even, wherein each pair of layers is comprised of:
   (a) a surface layer consisting essentially of a thermoplastic polymer and about 10 to 75 weight percent, based on the total weight of the surface layer, of mica having an aspect ratio of at least 20 to 1; and
   (b) a strength layer adjacent to said surface layer comprised of a thermoplastic polymer and about 10 to 60 weight percent, based on the total weight of the strength layer, of a long glass fiber mat comprised of fibers having a length of at least 1 inch, said mat being substantially encased in a matrix of said thermoplastic, wherein the ratio of the volume percent of said mica in the surface layer to the volume percent of said glass fiber mat in the strength layer is about 1.75 to 2.5.

2. The sheet of claim 1 wherein the thermoplastic of either layer is independently selected from the group consisting of polyamides, polyolefins, and polyesters.

3. The sheet of claim 1 wherein the thermoplastic polymer of both layers is the same.

4. The sheet of claim 1 wherein the surface layer contains about 40 to 65 wt. % mica.

5. The sheet of claim 1 wherein the strength layer contains about 20 to 40 wt. % long glass fibers.

6. The sheet of claim 1 wherein only one pair of layers is present.

7. The sheet of claim 1 having an overall CTE of about 2 to $3 \times 10^{-5}$°C.$^{-1}$ over the temperature range of about 23° to about 170° C.

8. A laminate comprising the sheet of claim 1, having an overall CTE of about 2 to $3 \times 10^{-5}$°C.$^{-1}$, over the temperature range of about 23° C. to about 170° C., laminated to a metal sheet having substantially the same CTE.

9. A warp-free laminated sheet comprised of one or more pairs of polyepsiloncaprolactam layers wherein each pair of layers is comprised of:
   (a) a surface layer consisting essentially of a polyepsiloncaprolactam and about 10 to 75 weight percent, based on the total weight of the surface layer, of mica having an aspect ratio of at least about 20 to 1; and
   (b) a strength layer adjacent to said surface layer comprised of a polyepsiloncaprolactam and about 10 to 60 weight percent, based on the total weight of the strength layer, of a long glass fiber mat having a length of at least 1 inch, said mat being encased in a matrix of said polycaprolactam wherein the ratio of the volume percent of said mica in the surface layer to the volume percent of said fiberglass mat in the strength layer is about 1.75 to 2.5.

10. The sheet of claim 9 wherein the surface layer contains about 40 to 65 weight percent mica.

11. The sheet of claim 9 wherein the strength layer contains about 20 to 40 weight percent long glass fiber.

12. The sheet of claim 9 having an overall CTE of about 2 to $3 \times 10^{-5}$°C.$^{-1}$ over the temperature range of about 23° to 170° C.

13. A laminate comprising the sheet of claim 9 having an overall CTE of about 2 to $3 \times 10^{-5}$°C.$^{-1}$, over the temperature range of about 23° to about 170° C., laminated to a metal sheet having substantially the same CTE.

14. A warp-free laminated sheet having one pair of layers comprising:
   (a) a surface layer consisting essentially of thermoplastic polymer and about 10 to 75 weight percent, based on the total weight of the surface layer, of mica having an aspect ratio of at least 20:1 and
   (b) a strength layer adjacent to said surface layer comprised of a thermoplastic polymer and about 10 to 60 weight percent, based on the total weight of the strength layer, of a long glass fiber mat comprised of fibers having a length of at least one inch, said mat being substantially encased in a matrix of said thermoplastic, wherein the ratio of the volume percent of said mica in the surface layer to the volume percent of said glass fiber mat in the strength layer is about 1.75 to 2.5.

15. A warp-free laminated sheet as recited in claim 14 further comprising more than one pair of thermoplastic layers, wherein each pair of thermoplastic layers includes a surface layer and a strength layer, the total number of said layers being even.

16. The warp-free laminated sheets as recited in claims 14 or 15 wherein the thermoplastic polymer consists of polyepsilon-caprolactam.

* * * * *